(12) United States Patent
Haneda et al.

(10) Patent No.: US 7,000,975 B2
(45) Date of Patent: Feb. 21, 2006

(54) BUMPER DEVICE

(75) Inventors: Shinichi Haneda, Anjo (JP); Kiyoichi Kita, Toyota (JP); Kazunari Azuchi, Himi (JP)

(73) Assignees: Aisin Seiki Kabushiki Kaisha, Kariya (JP); Aisin Keikinzoku Kabushiki Kaisha, Shinminato (JP)

( * ) Notice: Subject to any disclaimer, the term of this patent is extended or adjusted under 35 U.S.C. 154(b) by 0 days.

(21) Appl. No.: 10/509,761

(22) PCT Filed: Apr. 21, 2003

(86) PCT No.: PCT/JP03/05035

§ 371 (c)(1),
(2), (4) Date: Sep. 30, 2004

(87) PCT Pub. No.: WO03/089275

PCT Pub. Date: Oct. 30, 2003

(65) Prior Publication Data

US 2005/0104393 A1 May 19, 2005

(30) Foreign Application Priority Data

Apr. 19, 2002 (JP) .............................. 2002-116953

(51) Int. Cl.
*B60R 19/02* (2006.01)

(52) U.S. Cl. ..................................... 296/132; 293/133

(58) Field of Classification Search ................ 293/133, 293/132
See application file for complete search history.

(56) References Cited

FOREIGN PATENT DOCUMENTS

| JP | 8-108815 | | 4/1996 |
|----|----------|---|--------|
| JP | 11-208393 | | 8/1999 |
| JP | 2001-114043 | | 4/2001 |
| JP | 2001-230556 | * | 7/2001 |
| JP | 2001-294106 | | 10/2001 |
| JP | 2002-12104 | | 1/2002 |
| JP | 2002-67840 | | 3/2002 |

* cited by examiner

*Primary Examiner*—Joseph D. Pape
(74) *Attorney, Agent, or Firm*—Buchanan Ingersoll PC

(57) ABSTRACT

A bumper device, wherein the front wall part (5) and the rear wall part (6) of a bumper stay (4) disposed between a bumper reinforcement (2) and a side member (3) and connected to each other through a plurality of ribs (7, 8, 9,10), the inner and outer ribs (7, 8) diverge forward, a projected part (11) extending inward is provided on the inner rib (7), and the width dimension (11) of the front wall part (5) is formed larger than the width dimension (12) of the rear wall part (6), whereby the inner rib (7) of the plurality of ribs (side walls) disposed between the bumper reinforcement and the side member of a vehicle body to connect the front and rear walls of the bumper stay to each other can be prevented from being bent inward.

15 Claims, 5 Drawing Sheets

US 7,000,975 B2

BUMPER DEVICE

TECHNICAL FIELD

The present invention relates to a bumper device having an improved bumper stay.

BACKGROUND ART

There is used a bumper device for buffering an impact energy transmitted from a bumper reinforcement to a vehicle body as less as possible in collision of a vehicle and restraining an adverse influence on a passenger.

The bumper devices are of a type for arranging a bumper stay between a bumper reinforcement extended in a width direction of a vehicle and a side member (also referred to as side frame) on each side of a vehicle body and absorbing an impact energy mainly by plastic deformation of the bumper reinforcement and of a type of arranging a crash box in place of the bumper stay and absorbing the impact energy mainly by plastic deformation of the crash box.

A bumper device of the former type is disclosed in JP-A-2001-294106. The example uses a front wall in line with a rear wall of a bumper reinforcement and fixed thereto, a rear wall attached to a front end portion of a side member, and a bumper stay including at least two pieces of side walls for connecting the front wall and the rear wall.

The publicly-known bumper stay teaches forming a closed hollow portion by the front wall and the rear wall, forming an open hollow portion opened to a front side by making the front wall discontinuous, bringing the side wall into a hollow state, or arranging the side wall with an angle of inclination relative to the rear wall.

According to the pair of side walls of the bumper stay, the side wall on an inner side disposed on a center side of the vehicle is made to be longer than the side wall on an outer side and the front wall is made to coincide with a rear of the bumper reinforcement.

When an impact force (load) by collision of the vehicle is operated to the bumper reinforcement of the bumper device having such a bumper stay, before plastic deformation of the bumper reinforcement, a longer one, that is, the inner side of the side wall of the bumper stay is deformed to fall to the inner side and the impact force is absorbed by a remaining one of the side wall. Therefore, first, the bumper stay is crashed and next, the impact energy is started to be absorbed by the plastic deformation of the bumper reinforcement.

The crash of the bumper stay causes to break the side member by the impact energy, further, support of the bumper reinforcement is lost, the bumper reinforcement is produced with unexpected plastic deformation and an efficiency of absorbing the impact energy is reduced.

Therefore, it is a problem of the invention to be solved to resolve the above-described drawback of the prior art.

DISCLOSURE OF THE INVENTION

The invention adopts technical means for arranging inner and outer side ribs connecting front and rear wall portions by attaching an angle of inclination to diverge the ribs to a front side (preferably, 10° through 45°) and forming a projected portion projected to an inner side at a portion of coupling the inner side rib and the front wall portion in order to resolve the above-described problem.

By adopting the technical means, when an impact force (load) is operated to a bumper reinforcement, the projected portion of the inner side rib is displaced to the inner side and slightly to a rear side and the displacement displaces a remaining portion of the inner side rib to be orthogonal to the rear wall portion.

The displacement enables to receive the impact force by the inner side rib substantially uniformly with other rib and therefore, the bumper reinforcement is correctly supported by the bumper stay and the impact energy by the plastic deformation of the bumper reinforcement can highly be absorbed.

A width direction in a vehicle width direction of the front wall portion is larger than a width dimension of the rear wall portion and a crash range of the bumper reinforcement can be constituted widely and the crash load can be improved. Therefrom, an initial load of the plastic deformation can be reduced, in other words, thin-walled and light-weighted formation of the bumper reinforcement can be constituted.

According to the invention, there is provided a bumper apparatus characterized in a bumper apparatus including a bumper reinforcement extended in a width direction of a vehicle and a bumper stay fixed to a side member on a side of a vehicle body, wherein the bumper stay includes a front wall portion fixed to the bumper reinforcement, a rear wall portion fixed to the side member on the side of the vehicle body, and a plurality of ribs for coupling the two wall portions and the inner and the outer side ribs are provided with an angle of inclination diverging to a front side, the inner side rib includes a projected portion projected to an inner side and a dimension in a width direction of the front wall portion is larger than a dimension in a width direction of the rear wall portion.

BEST MODE FOR CARRYING OUT THE INVENTION

Figure 1:
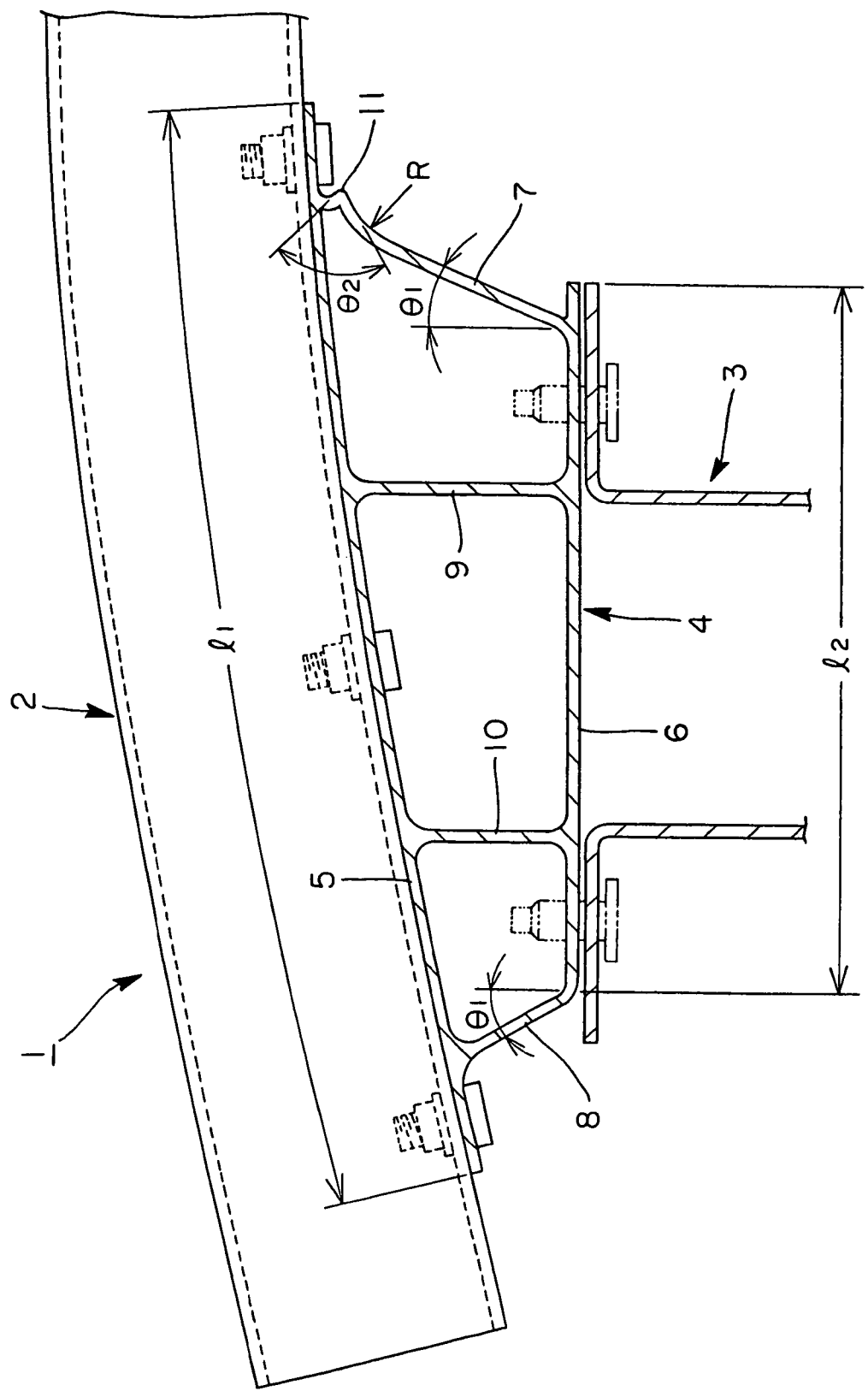
FIG. 1 is a sectional view of a bumper device according to an example of the invention.

A bumper device 1 includes a bumper reinforcement 2 extended in a width direction of a vehicle, and a bumper stay 4 arranged between a side member 3 on each side of a vehicle body and the bumper reinforcement 2.

The bumper reinforcement 2 comprises an extruded member of an aluminum based alloy material and a sectional shape thereof may be a publicly-known sectional shape in a shape of a Chinese character of 日 (hollow quadrangle with one say at inside thereof), 目 (hollow quadrangle with two stays at inside thereof), 田 (hollow quadrangle with a cross at inside thereof), or □ (hollow quadrangle), further, the side member 3 may be of a publicly-known shape formed by pressing a steel plate.

The bumper stay 4 comprises an extruded member of an aluminum based alloy material and comprises a front wall portion 5 in line with a rear face wall of the bumper reinforcement 2 and fixed thereto, a rear wall portion 6 fixed to a front end of the side member 3, and inner and outer side ribs 7, 8 and middle ribs 9, 10 connecting the two wall portions 5, 6.

A dimension 11 of the front wall portion 5 in the vehicle width direction is made to be larger than a dimension 12 of the rear wall portion 6 in the vehicle width direction. Making a dimension of the bumper reinforcement 2 in the vehicle width direction, that is, the crash range 11 larger enables to increase a crash load, in other words, to constitute thin-walled and light-weighted formation of the bumper reinforcement 2.

An angle of inclination $\theta_1$ of the inner and the outer side ribs 7, 8 relative to the rear wall portion 6 is made to fall in a range of 10° through 45° and the inner and outer side ribs 7, 8 are made to diverge forwardly. The middle ribs 9, 10 are orthogonal to the rear wall portion 6.

A portion of coupling the inner side rib 7 and the front wall portion 5 is provided with a projected portion 11 projected to the inner side. A projected angle $\theta_2$ Of the projected portion 11 is preferably made to fall in a range of 55° through 90°, more preferably, 75°. A bottom portion of the projected portion 11 is made to be formed by a circular arc face of R of 1 mm through 2 mm. Thicknesses of the ribs 7, 8, 9, 10 can be made to be, for example, 2 mm through 3.8 mm.

The projected portion 11 and the inner side rib 7 are coupled by a circular arc face. The circular arc face is constituted by a circular arc face of, for example, R of 20 mm.

Figure 2:
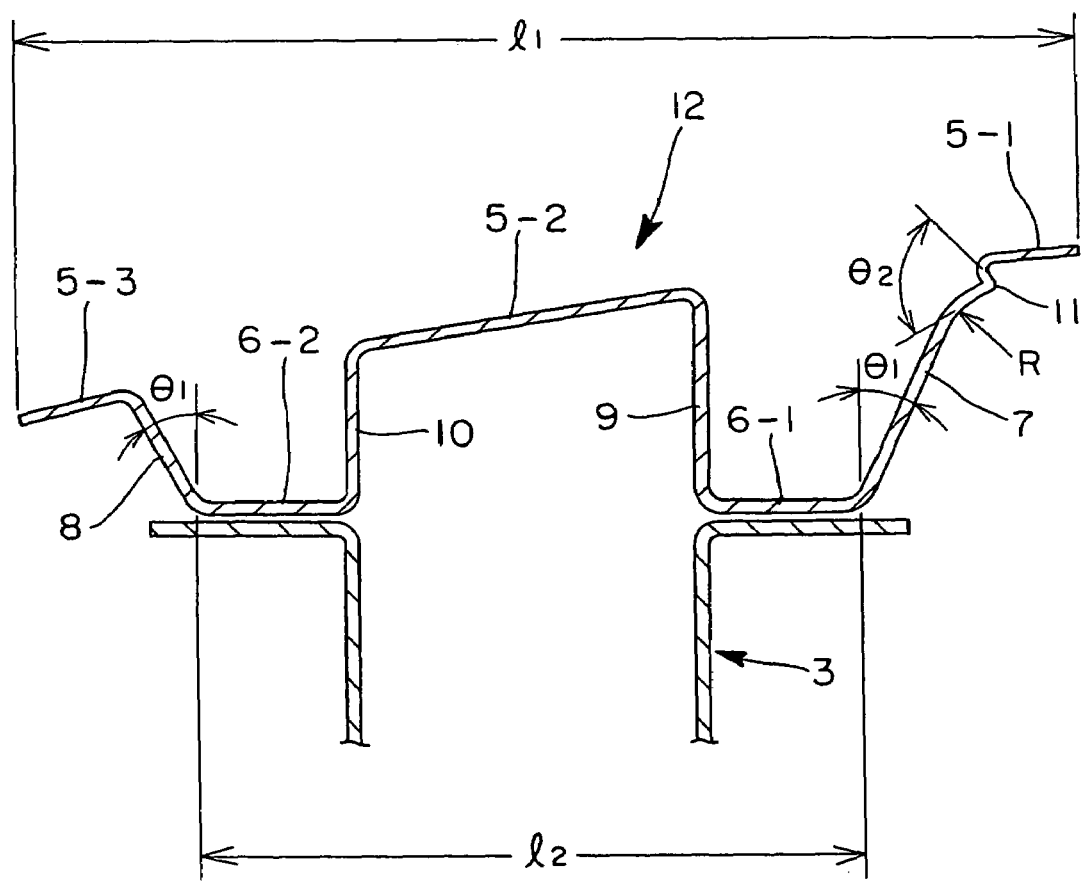
FIG. 2 is a sectional view showing a bumper stay made of a steel plate (made of steel).

FIG. 2 shows a bumper stay 12 formed by pressing one sheet of a steel plate. Front wall portions 5-1, 5-2, 5-3 comprise three pieces of separated wall portions, rear wall portions 6-1, 6-2 comprise two pieces of separated wall portions and the ribs 7, 8, 9, 10 are provided with shapes and inclinations the same as those of the example of FIG. 1.

The portion of coupling the inner side of rib 7 and the front wall portion 5-1 is provided with the projected portion 11 projected to the inner side continuous to the circular arc face of R. The width direction $l_1$ of the front wall portions 5-1, 5-2, 5-3 are larger than the width direction $l_2$ of the rear wall portions 6-1, 6-2, the angle of inclination $\theta_1$ of the inner and outer side ribs 7, 8 is made to fall in the range of 10° through 45°, and the projected angle $\theta_2$ of the projected portion 11 is made to fall in the range of 45° through 120°, preferably, 55 through 90°.

Figure 3:
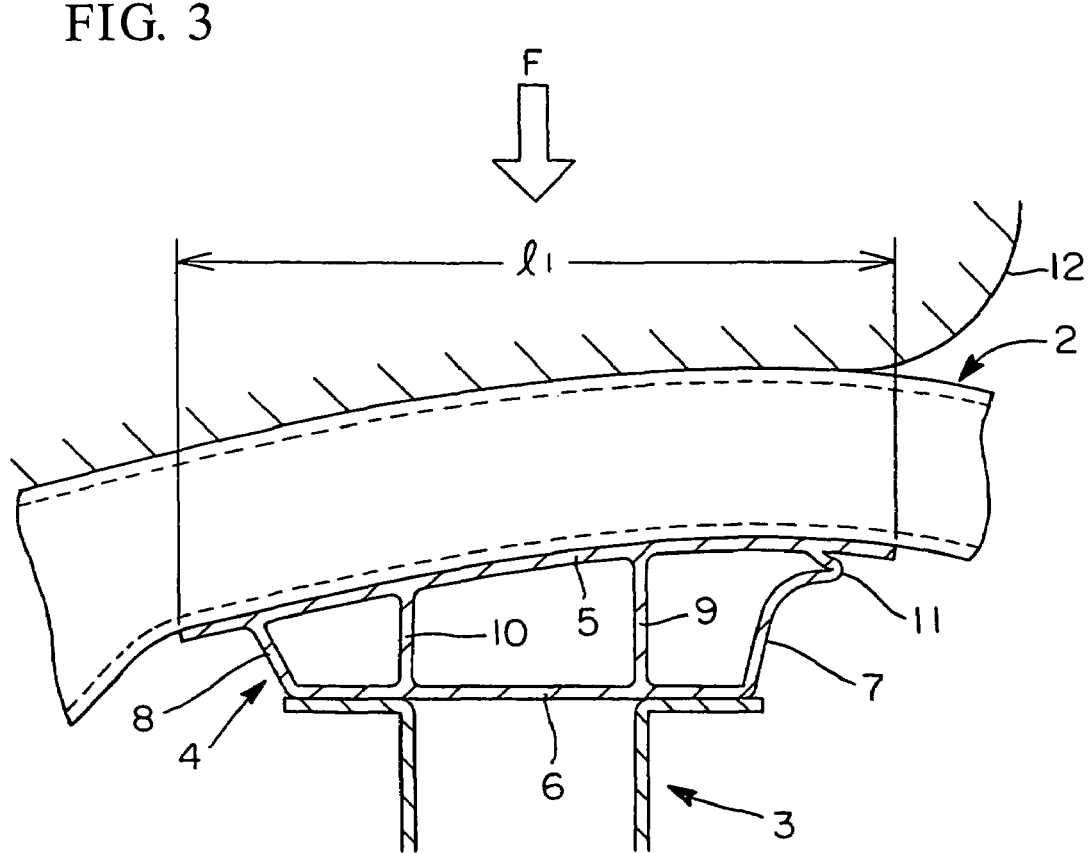
FIG. 3 is a plane view showing an initial state of a bumper reinforcement and a bumper stay when an offset impact force is received thereby.
Figure 4:
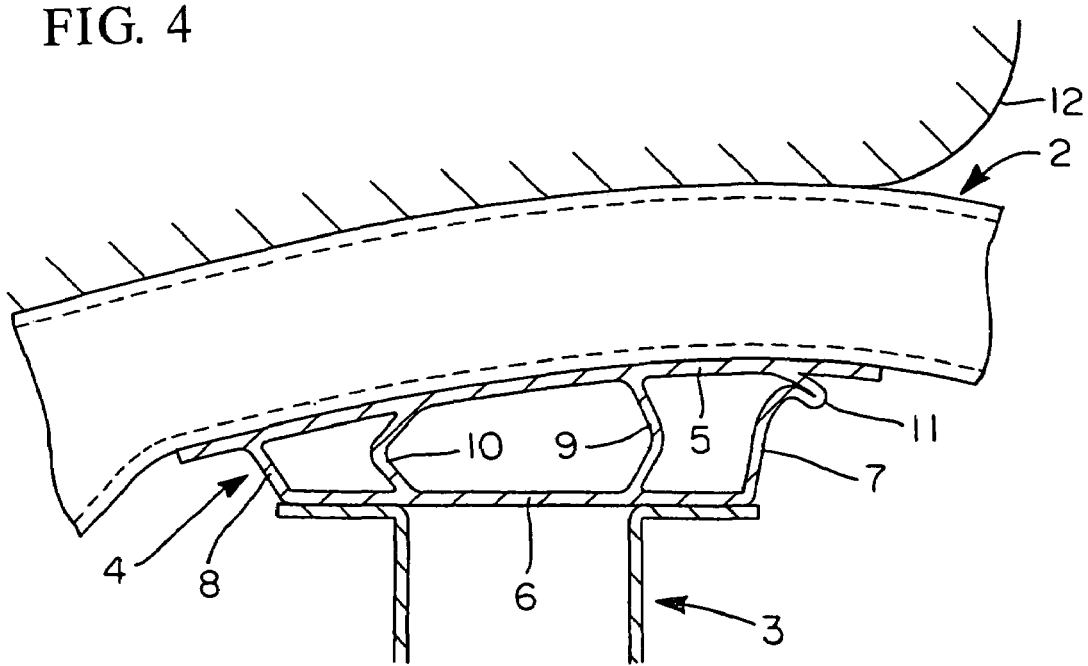
FIG. 4 is a plane view showing a state of progressing the state by FIG. 3.

FIG. 3 and FIG. 4 show plastic deformation of the bumper reinforcement 2 and a state of displacing the inner side rib 7 of the bumper stay 4 when an impact force F by collision is operated to the bumper reinforcement.

The impact force F is received by the wide crash range 11 and the bumper reinforcement 2 is plastically deformed in the wide range in the width direction of the vehicle. By inclining the inner side rib 7 to the inner side, the stroke, that means state of displacing of the bumper reinforcement 2 to the rear side can be restrained to be small, smaller than that of the prior art in the dimension between the inner side rib 7 of the left and right bumper stays 4.

The example shown in FIG. 3 and FIG. 4 is referred to as a so-to-speak offset collision and the bumper apparatus is collided with a rigid barrier 12 at a low speed (assumed to be 8 km/h of speed per hour).

Figure 5:
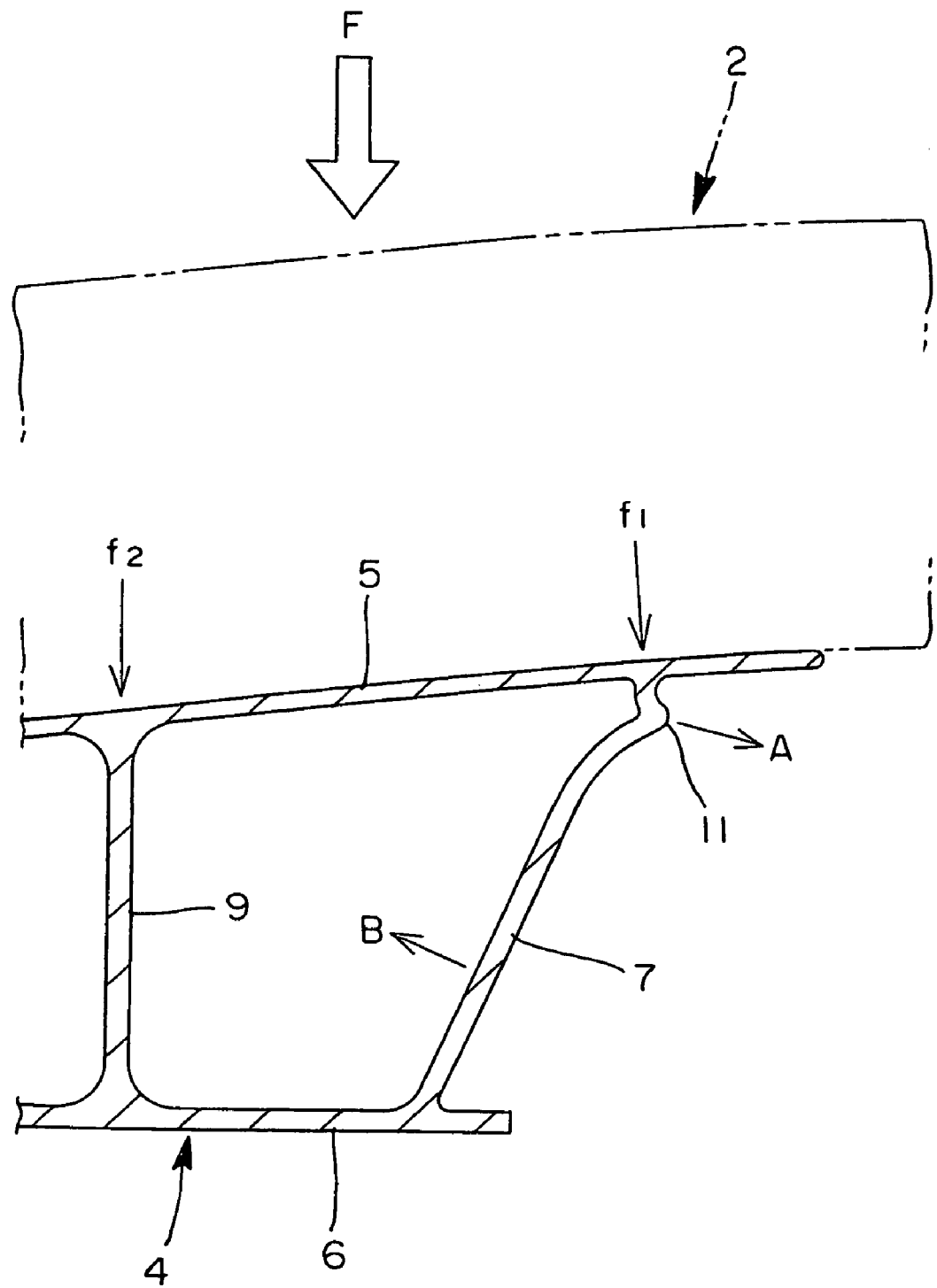
FIG. 5 is a partially enlarged sectional view showing an inner side rib of the bumper stay.

At an initial stage of collision, the projected portion 11 of the inner side rib 7 is displaced to the inner side to restrict an onset of buckling of the inner side rib 7 (A direction shown in FIG. 5).

In the meantime, a buckling direction of the inner side rib 7 is restricted to a side of the middle rib 9 (inner side of section) and as shown by FIG. 4, the inner side rib 7 is displaced in B direction shown in FIG. 5. The deformation enables to input an equally distributed load to four pieces of the ribs 7, 8, 9, 10 and absorb the impact energy by equally distributed buckling.

A further detailed description will be given of operation of the projected portion 11 when the offset impact force F is operated to the bumper stay 4 via the bumper reinforcement 2 in reference to FIG. 5.

Whereas a component $f_2$ of the impact force F operated to the middle rib 9 is operated in an axis center direction of buckling the middle rib 9, a component $f_1$ of the impact force F operated to the inner side rib is inputted to the inner side rib 7 from a skewed direction to displace the projected portion 11 in the arrow mark A direction. The movement of the projected portion 11 enables to finally displace the remaining portion of the inner side rib 7 in the arrow mark B direction, form the inner side rib 7 in a shape proximate to erection, bring the middle rib 9 and the inner side rib 7 into substantially a parallel relationship and receive the component $f_1$ in an axis line direction of the inner side rib 7, that is, as buckling load.

Thereby, the components $f_1$, $f_2$ . . . become substantially uniformly operated to the respective ribs and support wide plastic deformation of the bumper reinforcement 2.

The bumper stay 4 having the shape shown in FIG. 1 is constituted by an extruded member of an aluminum based alloy material of 7003S-T5. An average plate thickness is constituted by 2.5 mm, however, the plate thickness of the inner side rib 7 is constituted by 2.8 mm, $l_1$ is constituted by 200 mm, $l_2$ is constituted by 70 mm, R is constituted by 20 mm, $\theta_1$ is constituted by 25° and $\theta_2$ is constituted by 75°.

As a comparative example, there is fabricated a bumper stay by an extruded section of an aluminum alloy material of 7003S-T5 having an average plate thickness of 2.5 mm including two pieces of ribs of $l_1=l_2=70$ mm and orthogonal to front and rear wall portions.

The same bumper reinforcement and the same side member are used and an offset impact force test under the same condition is carried out.

Figure 6:
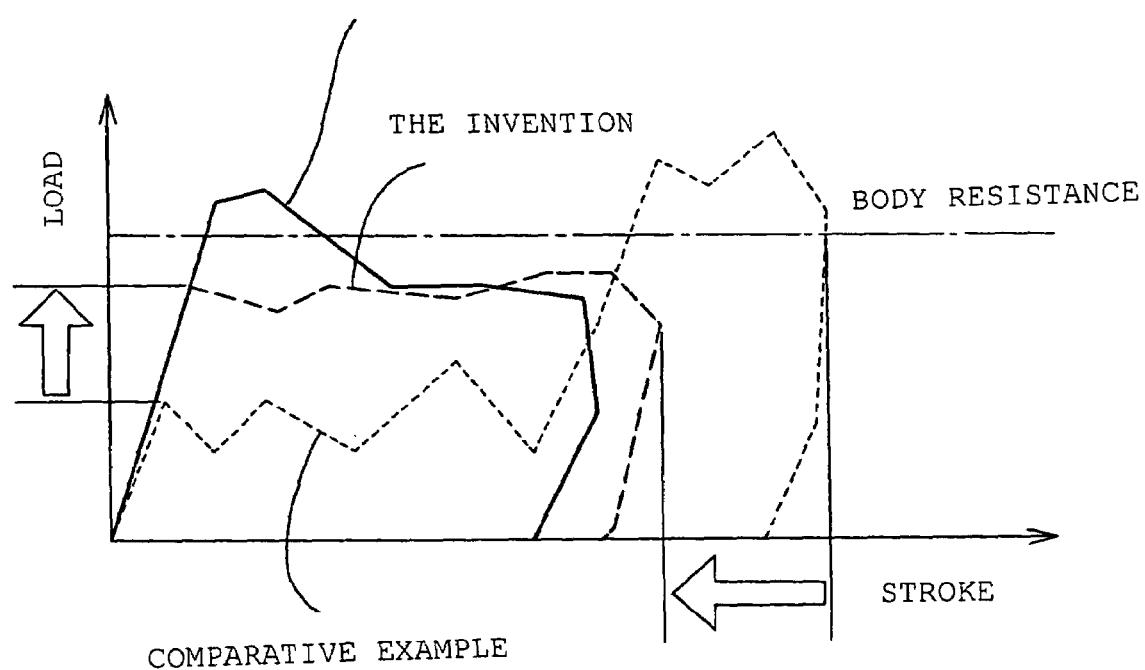
FIG. 6 is a diagram showing a relationship between a stroke and a load.

A result thereof is shown in FIG. 6. According to the example of the invention, it has been confirmed that the stroke is reduced by 20% and the load is increased by a multiplication factor of 1.27. Further, it can be confirmed that the crash range of the bumper reinforcement of the example of the invention is increased.

The impact force test is carried out also with regard to the shape shown in FIG. 1 which is not provided with the projected portion 11 under a condition the same as the above-described. As shown by FIG. 6, damage of the body is recognized by exceeding a body resistance and effectiveness of the projected portion has been confirmed.

What is claimed is:

1. A bumper apparatus comprising a bumper reinforcement extended in a width direction of a vehicle and a bumper stay fixed to a side member on a side of a body of the vehicle, the side member comprising opposed side walls, wherein the bumper stay includes a front wall portion fixed to the bumper reinforcement, a rear wall portion fixed to the side member, and a plurality of ribs coupling the rear and front wall portions, the plurality of ribs comprising an inner side rib, an outer side rib and a pair of middle ribs positioned between the inner and outer side ribs in the width direction of the vehicle, the middle ribs being positioned relative to the side walls of the side member such that each of the middle ribs is positioned along a line extending from one of the side walls of the side member, and the inner and the outer side ribs are provided with an angle of inclination diverging toward the bumper reinforcement, the inner side rib includes a projected portion projected to an inner side, the projected portion being located at a portion coupling the inner side rib and the front wall portion, and a dimension in a width direction of the front wall portion is larger than a dimension in a width direction of the rear wall portion.

2. The bumper apparatus according to claim 1, wherein a single projected portion is provided on the inner side rib.

3. The bumper apparatus according to claim 2, wherein the projected portion forms an opening angle in a range of 45° through 120° with a portion of the inner side rib adjoining the projected portion.

4. The bumper apparatus according to claim 2, wherein the bumper stay is a pressed product of one sheet of a steel plate and a hollow portion between the respective ribs is opened to a front side or a rear side.

5. The bumper apparatus according to claim 2, wherein the bumper stay comprises an extruded member of an aluminum based alloy material and three pieces of closed hollow portions thereof are partitioned between the front and the rear wall portions by the ribs.

6. The bumper apparatus according to claim 5, wherein a length of the outer side rib is smaller than a length of the inner side rib.

7. A bumper apparatus comprising a bumper reinforcement extending in a width direction of a vehicle and a bumper stay fixed to a side member on a body of the vehicle, the bumper stay comprising a front wall portion fixed to the bumper reinforcement, a rear wall portion fixed to the side member, and a plurality of ribs coupling the rear wall portion and the front wall portion, the plurality of ribs comprising an inner side rib, an outer side rib and two middle ribs positioned between the inner and outer side ribs in the width direction of the vehicle, the inner side rib and the outer side rib diverging away from one another in a direction toward the bumper reinforcement, the inner side rib and one of the middle ribs located closest to the inner side rib forming a hollow interior region within the bumper stay, the inner side rib including a projected portion projecting in a direction away from the hollow interior region, the front wall portion of the bumper stay possessing a width dimension larger than a width dimension of the rear wall portion.

8. The bumper apparatus according to claim 7, wherein the inner side rib is provided with a single projected portion.

9. The bumper apparatus according to claim 7, wherein the projected portion is formed in part by an actuate shaped portion having a radius of curvature.

10. The bumper apparatus according to claim 7, wherein the projected portion forms an opening angle in a range of 45° through 120° with a portion of the inner side rib adjoining the projected portion.

11. The bumper apparatus according to claim 7, wherein the bumper stay is a pressed product of one sheet of a steel plate and includes hollow portions between adjacent ribs that open to a front side or a rear side.

12. The bumper apparatus according to claim 7, wherein the bumper stay comprises an extruded member of an aluminum based alloy material, the bumper stay comprising three closed hollow portions between the front and the rear wall portions, the hollow portions being separated from one another by the ribs.

13. The bumper apparatus according to claim 7, wherein a length of the outer side rib is less than a length of the inner side rib.

14. The bumper apparatus according to claim 7, wherein the projected portion is positioned at a portion coupling the inner side rib and the front wall portion.

15. The bumper apparatus according to claim 7, wherein each of the middle ribs is aligned with a side wall of the side member.

* * * * *